Oct. 3, 1961 J. C. KAYTOR 3,002,395
VARIABLE SPEED TRANSMISSION
Filed May 29, 1958 2 Sheets-Sheet 1
Fig.1
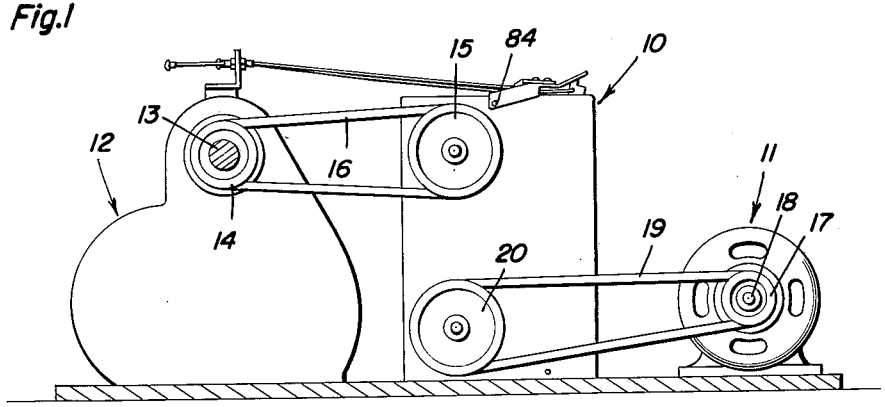
Fig.2
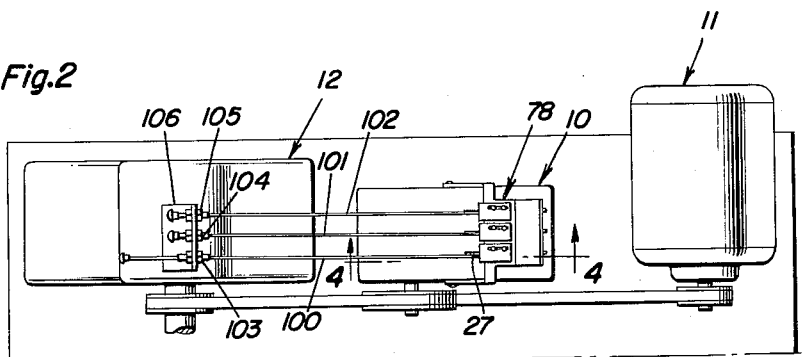
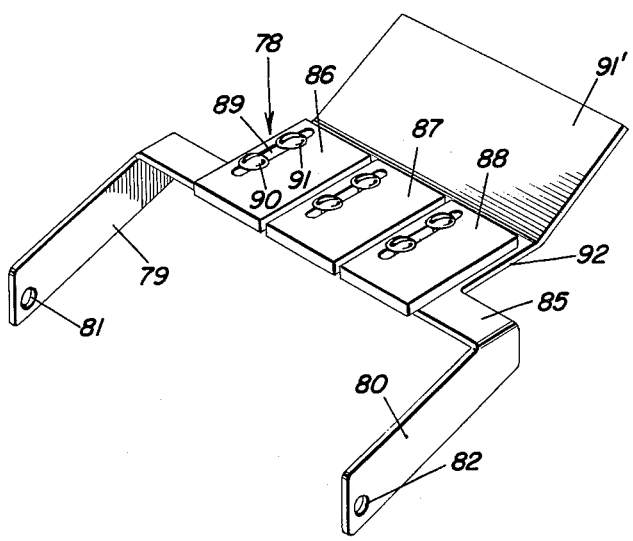
Fig.3
John C. Kaytor
INVENTOR.
BY *Clarence A. O'Brien*
*and Harvey B. Jacobson*
Attorneys Oct. 3, 1961 J. C. KAYTOR 3,002,395
VARIABLE SPEED TRANSMISSION
Filed May 29, 1958 2 Sheets-Sheet 2
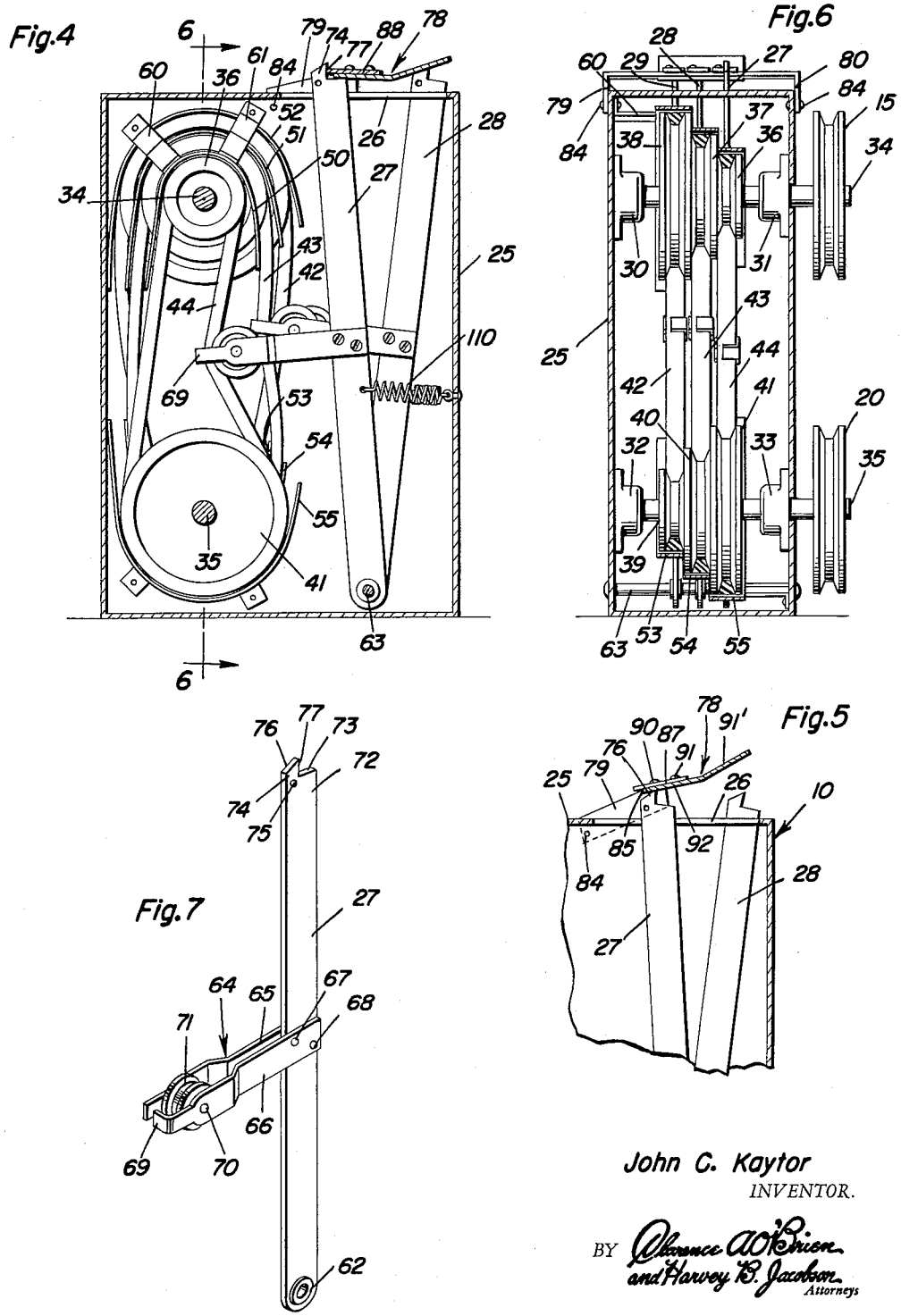
John C. Kaytor
INVENTOR.

United States Patent Office 3,002,395
Patented Oct. 3, 1961

3,002,395
VARIABLE SPEED TRANSMISSION
John C. Kaytor, 11088 Eve Ave., Lynwood, Calif.; Rose
A. Kaytor, executrix of the estate of John C. Kaytor,
deceased, assignor to herself
Filed May 29, 1958, Ser. No. 738,788
8 Claims. (Cl. 74—217)

This invention relates to power transmission devices in general and pertains more particularly to a simple, yet effective system employing a plurality of selectively operable belt drive mechanisms for effecting desired drive coupling relations or ratios between a pair of shafts.

Of primary concern in connection with this invention is to provide a substantially completely closed or housed change speed power transmission device which will be of economical construction and which yet, at the same time, will be extremely effective for the purposes intended.

A further object of this invention and of primary concern in conjunction therewith is to provide a novel latch mechanism associated with the control device, which latch mechanism operates in such a manner as to permit only one of a plurality of control levers or similar elements to be moved to an operative position at any one time, the physical act of moving a further or other element to its operative position serving to effect release of any element simultaneously held in its operative position.

A further object of this invention is to provide improvements in power transmission devices of the variable speed type employing a substantially closed system incorporating a housing within which are journaled a pair of parallel shafts each carrying a plurality of pulleys rigidly therewith and with their being associated, with corresponding pairs of pulleys on the two shafts, a slack belt which, when tensioned, will effect a predetermined and fixed drive ratio between the two shafts, there being associated with each such belt a tensioning device or assembly selectively operable to effect the desired drive ratio.

Another object of this invention is to provide an improved power transmission device in accordance with the preceding object wherein the tensioning assemblied have associated therewith a latch means for holding any one and only one of the tensioning assemblies in the operative belt tightening position, the latch means incorporating cam mechanism engageable by the tensioning devices as the same are moved from their inoperative toward their operative position, in which they are latched, so as to temporarily render the latch means inoperative so as to release any other tensioning device which may have been engaged in its operative position.

Still another object of this invention is to provide a device in accordance with the preceding objects wherein the latch mechanism consists essentially of a supporting portion of generally U-shaped configuration presenting a pair of spaced, parallel legs and an interconnecting bight portion, the legs being pivotally connected at their free ends to the associated transmission housing in embracing relationship thereto and with the bight portion mounting a plurality of latch plates in adjustable relationship thereon for engaging with and holding the tensioning devices in a predetermined operative position and with the bight also carrying an upwardly angulated cam plate portion engageable by the tensioning devices as the same are moved toward their operative position such as to pivot the latch mechanism upwardly temporarily into an inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the invention illustrating, in conjunction therewith, a driving motor and a driven instrumentality;

FIGURE 2 is a top plan view of the assembly illustrated in FIGURE 1 and showing certain details of the control mechanism;

FIGURE 3 is an enlarged perspective view of the latch mechanism;

FIGURE 4 is an enlarged vertical section taken substantially along the plane of section line 4—4 in FIGURE 2 illustrating details of the internal construction of the power transmission device;

FIGURE 5 is a partial section showing details of the latch mechanism in conjunction with the operation of the individual tensioning devices;

FIGURE 6 is a transverse vertical section taken substantially along the plane of section line 6—6 in FIGURE 4 illustrating further details of the internal construction of the power transmission device; and FIGURE 7 is an enlarged perspective view of one of the tensioning assemblies.

Referring at this time more particularly to FIGURE 1, the reference numeral 10 indicates in general the power transmission device in accordance with this invention whereas the reference numeral 11 indicates in general a driving motor or power source for operating the transmission device 10 and whereas the reference numeral 12 indicates in general an instrumentality to be driven from the drive motor 11 and through the power transmission device 10. It is to be understood that the instrumentality 12 is diagrammatically shown only, the details thereof being insignificant insofar as this invention is concerned, the only characteristic of the instrumentality 12 being that it is provided with a shift 13 which is desired to be driven and which shaft in the particular embodiment shown is provided with a pulley 14 driven from a pulley 15 on the power transmission device 10 through the belt 16. It is to be understood, of course, that a belt and pulley system need not be utilized as effecting the final drive between the power transmission device 10 and the shaft 13 of the instrumentality to be driven. Alternatively, any other equivalent means may be utilized.

Likewise, in the particular embodiment shown, the drive motor or power source 11, which in this case is an electric motor, imparts the drive to the power transmission device 10 through the medium of a pulley 17 affixed to the drive shaft 18 of the motor and, through belt 19 to the pulley 20 on the power transmission device 10. It is to be understood that this particular type of drive between the motor 11 and the power transmission device 10 need not be adhered to but any suitable means may be provided for effecting the drive to the shaft carrying the pulley 20, hereinafter more particularly pointed out.

As is best shown in FIGURES 4 and 6, the power transmission device consists essentially of a housing 25 which is substantially completely enclosed except for the slot 26 at the upper end thereof permitting of movement of the various or control levers 27, 28 and 29 as are hereinafter more particularly pointed out. The housing 25 is provided with suitable bearing members 30, 31 and 32, 33 which are aligned as illustrated best in FIGURE 6, to journal therein a pair of shafts 34 and 35, such shafts being disposed in spaced parallel relationship with each other and having end portions projecting outwardly of the housing 25 and provided thereon with the pulleys 15 and 20 previously described, although it is to be understood again that pulleys 15 and 20 may be replaced by any suitable driving connection with the instrumentality 12 and motor 11.

Each shaft 34 and 35 has rigid therewith, within the housing 25, a plurality of pulleys, all of different diameters such as are shown, such as the pulleys 36, 37, 38 and pulleys 39, 40, and 41 on the shafts 34 and 35, respectively. These pulleys are all rigid with their respective shafts and rotate in unison therewith. Corresponding pairs of pulleys on the two shafts, such as the pulleys 38, 39 and 37, 40 are disposed in vertical registry and entrained thereabout and normally in slack or loose engagement therewith are the belts 42, 43 and 44.

For the purpose of serving to retain the belts 42, 43 and 44 properly trained over their respective pairs of pulleys guard or guide strips 50, 51 and 52 and 53, 54 and 55 are provided, corresponding groups of such guide strips being rigidly interconnected to each other and being supported from the interior of the housing as by means of bracket straps 60 and 61 as is best illustrated in FIGURE 4.

As is best illustrated in FIGURE 7, the control levers 27, 28 and 29 are identically formed and each includes an elongate lever previously described having, at its lower end, a suitable bushed aperture 62 for pivotal reception of a transverse pivot shaft 63, see particularly FIGURES 4 and 6, whereby the levers will be permitted of rocking motion with respect to the pivot shaft 63. Intermediate the upper and lower ends of each lever is carried a bracket assembly indicated generally by the reference character 64. Each such assembly 64 is laterally projecting with respect to the corresponding lever and may be made of a pair of elongate strips of material providing spaced legs 65 and 66 sandwiching, at their inner ends, the lever 27 therebetween and affixed thereto as by fasteners 67 and 68. One leg 66 has a laterally directed free end portion or bight 69 adapted to engage behind a corresponding belt, see particularly FIGURES 4 and 6, and intermediate portions of legs 65 and 66 carry the pin or shaft 70 upon which the idler roller 71 is journalled, the same being spaced from the opposed surface of the bight 69 by distance greater than the width or thickness of the belts and being operative, when the corresponding lever is moved toward the shafts 34 and 35 to take up the slack in the corresponding belt and effect a driving connection between the two shafts in accordance with the ratio predetermined by the corresponding pairs of pulleys on the two shafts.

As was previously described, the upper end portions 72 of the levers project outwardly through the top of the housing 25 and each such upper end portion is notched as at 73 to present an ear portion 74 having an aperture 75 adjacent thereto and presenting the sloping cam end portion 76 and the vertical locking edge portion 77 as is shown.

These upper end portions of the levers are adapted to cooperate with the latch mechanism indicated generally by the reference character 78 and the details of which are best illustrated in FIGURE 3. The latch means consists essentially of a supporting bracket portion of generally U-shaped configuration presenting spaced generally parallel legs 79 and 80 apertured at their free end portions as indicated by the reference character 81 and 82 and which legs embrace the upper portion of the housing 25 and are pivotally attached thereto through the apertures 81 and 82 by suitable rivets, fasteners or the like 84. The legs 79 and 80 are interconnected by the bight portion 85 upon which is mounted a plurality of latch plates 86, 87 and 88 transversely spaced across the bight and adapted to individually cooperate with individual ones of the levers 27, 28 and 29.

Each latch plate is provided with an elongate longitudinally extending slot 89 receiving therethrough a pair of fasteners 90 and 91 threaded into the bight portion and effecting a clamping connection between the individual latch plate and the bight but permitting of longitudinal adjustments of the latch plate for a purpose which will be presently apparent.

The bight 85 is provided with an extension portion 92 underlying the latch plates 86, 87 and 88 and terminates at its rear end in an upwardly angulated cam plate 91 the purpose of which will also be presently apparent.

As can be best illustrated in FIGURE 2, there are a plurality of operating rod or cables 100, 101 and 102 connected with the several levers 27, 28 and 29 by virtue of the apertures 75 therein previously described and which cables in the particular embodiment shown, are guided adjacent the free ends thereof through nipple portions 103, 104 and 105 carried by a suitable mounting assembly 106. The individual control cables or rods are adapted to be pulled upon to move their corresponding levers 27, 28 and 29 to belt tightening or tensioning positions such as the position illustrated for the lever 27 in FIGURE 4. In this position of the lever, the vertical latch edge 77 thereof will engage behind a corresponding latch plate 88 of the latch assembly 78. During movement of the lever toward its operative position from the inoperative position such as the positions for the levers 28 and 29 in FIGURES 4 and 6, the upper cam portion 76 thereof will have swung the latch assembly 78 upwardly about its pivotal axis 84 to permit the engagement of the corresponding latch plate 88 behind the upper end gear 74 and into engagement with the latch 77. Thus, a predetermined and fixed drive relationship between the two shafts 34 and 35 is effected. When it is desired to effect a different drive ratio between the two shafts 34 and 35, another one of the levers is actuated and in the process of this other lever being actuated, the cam edge 76 thereof will swing the latch mechanism 78 upwardly as illustrated in FIGURE 5 to such a position as to disengage the previously held lever 27 from the latch means and permit the same to be moved back to an inoperative position. To assist in moving the lever back to its inoperative position, the springs 110 are provided, being interconnected as shown best in FIGURE 4 between intermediate portions of the levers and the interior of the housing. In this manner, it is absolutely assured that no belt and pulley systems can be simultaneously engaged to effect a coupling between the shafts 34 and 35 and at the same time a smooth power transmission between the two shafts is effected. Yet, at the same time, the arrangement of parts is extremely simple and economical of manufacture.

The housing 25, being substantially completely enclosed prevents the entrance of foreign material or the like into the interior of the same such as would affect the operation of the power transmission device. At the same time, the power transmission device is extremely pleasing in appearance and is entirely safe in operation.

As an alternative to the tensioning adjustment for the belts as is accommodated for by the plates 89, in plates 86, 87 and 88, such plates may be non-adjustably secured and instead, the upper ends of the several control levers 27, 28 and 29 may be provided with several steps rather than just the single step shown in the drawing. In this manner, the operator may, by varying the pull on the control knobs, engage the plates 86, 87 or 88 in a desired one of such plural steps in the control arms to thus vary the belt tension.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multiple speed transmission device comprising a closed housing having a pair of spaced, parallel shafts journalled therein, a plurality of pulleys fixed to each shaft, each pulley on one of said shafts being aligned with a pulley on the other shaft, the pulleys on at least said one shaft being of different diameters to effect different coupling speeds between the two shafts, a slack belt trained about each corresponding pair of pulleys, a tensioning lever for each belt pivotally attached at one end within the housing for selective individual movement toward and away from the belts and each carrying an idler roller for pressing against and taking-up its corresponding belt to effect a drive between the corresponding pair of pulleys, the opposite ends of said levers projecting from said housing, said latch means pivotally embracing said housing and engageable with said levers for holding the same selectively in their operative, belt take-up positions including a cam portion engageable by any of said levers as they are moved toward their operative position to pivot said latch means releasing any of said levers held in operative position thereby, said latch means including a support portion of generally U-shaped configuration comprising spaced legs interconnected by a bight, individually mounted and selectively adjusted latch plates mounted upon said bight for engaging individual ones of said levers, and an angulated cam plate rigid with said bight and in the path of movement of said levers for swinging said latch means to move said latch plates out of position engaging a lever.

2. In a control assembly, a plurality of levers mounted upon a support means for selective individual movement between operative and inoperative positions and normally urged to their inoperative position, movable latch means, each of said levers engageable with a section of said latch means to retain said levers in their operative position, said latch means including cam means engaged by any of said levers in an intermediate portion of their travel from inoperative to operative position and being so positioned to move said latch means out of latching position so as to release any of said levers being held in its operative position thereby upon the engagement of said cam means by a lever, said latch means engaging and retaining said lever in position upon its further movement to an operative position.

3. In a control assembly including at least three levers mounted upon a support means for individual movement between operative and inoperative positions and normally urged to their inoperative positions, latch means, each of said levers engageable with a section of said latch means to retain said levers in their operative position, said latch means including cam means engaged by said levers in an intermediate portion of their travel from inoperative to operative positions effecting release of any lever simultaneously being held in its operative position.

4. A multiple speed power transmission device comprising a housing having a pair of spaced parallel shafts journaled therein, a plurality of pulleys rigid with each shaft, the pulleys on at least one of said shafts being of varying diameters each aligned with a corresponding pulley on the other shaft, belts received over said aligned pulleys and loosely engaged therewith, a tensioning lever associated with each belt movable between an inoperative or slack belt position and an operative position in which the slack in the corresponding belt is taken up to effect a drive between the two shafts through the corresponding aligned pulleys, means normally urging said tensioning lever to the inoperative position, means for individually and selectively moving and urging the tensioning levers to the operative position, movable latch means, each of said tensioning levers engageable with a section of said latch means when said levers are in their operative positions to retain that lever in the operative position, said latch means including cam means engageable by said levers in an intermediate portion of their travel from inoperative to operative positions to effect movement of the latch means and the release of any lever being held in its operative position.

5. In a control assembly, a plurality of levers mounted upon a support means for selective individual movement between operative and inoperative positions and normally urged to their inoperative positions, movable latch means, each of said levers engageable with a section of said latch means to retain said levers in their operative position, said latch means including cam means engageable by said levers in an intermediate portion of their travel from inoperative to operative positions to effect movement of the latch means and the release of any lever simultaneously being held in its operative position.

6. A multiple speed power transmission device comprising a housing having a pair of spaced parallel shafts journaled therein, a plurality of pulleys rigid with each shaft, the pulleys on at least one of said shafts being of varying diameters with each aligned with a corresponding pulley on the other shaft, belts received over said aligned pulleys and loosely engaged therewith, a tensioning lever associated with each belt movable between an inoperative or slack belt position and an operative position in which the slack in the corresponding belt is taken up to effect a drive between the two shafts through the corresponding aligned pulleys, means normally urging each tensioning lever to the inoperative position, means for individually and selectively moving and urging the tensioning levers to the operative position, movable latch means, each of said tensioning levers engageable with a section of said latch means when in their operative positions to retain the same in their operative positions, said latch means including cam means engageable by said levers in an intermediate portion of their travel from inoperative to operative positions to effect movement of the latch means and the release of any lever simultaneously being held in its operative position.

7. A multiple speed transmission device comprising a closed housing having a pair of spaced parallel shafts journaled therein, a plurality of pulleys fixed to each shaft, each pulley on said shafts being aligned with a pulley on the other shaft, the pulleys on at least one of said shafts being of different diameters to effect different coupling speeds between the two shafts, a slack belt trained about each corresponding pair of pulleys, a tensioning lever for each belt pivotally attached at one end within the housing for selective individual movement toward and away from the belts and each carrying an idler roller for pressing against and taking up its corresponding belt to effect a drive between the corresponding pair of pulleys, and latch means engageable with said levers for selectively holding the same in the operative belt take up positions, said latch means including a movable portion having a cam thereon engageable by said levers as they are moved toward their operative positions for effecting movement of said movable portion of said latch means to release any levers being held in operative positions by said latch means.

8. A multiple speed transmission device comprising a closed housing having a pair of spaced parallel shafts journaled therein, a plurality of pulleys fixed to each shaft, each pulley on one of said shafts being aligned with a pulley on the other shaft, the pulleys on at least said one shaft being of different diameters to effect different coupling speeds between the two shafts, a slack belt entrained about each corresponding pair of pulleys, a tensioning lever for each belt pivotally attached at one end within the housing for selective individual movement toward and away from the belts and each carrying an idler roller for pressing against and taking up its corresponding belt to effect a drive between the corresponding pair of pulleys, the opposite ends of said levers projecting from said housing, latch means pivotally embracing said housing and engageable with said levers for holding the same in their operative belt slack taking up positions, said latch means including a cam portion engageable by any of said levers as they are moved toward their operative position to pivot said latch means out of engagement with any levers retained in their operative positions by said latch means whereby such levers may be returned to positions out of engagement with the corresponding belt.

References Cited in the file of this patent

UNITED STATES PATENTS

| | | |
|---|---|---|
| 320,687 | Price | June 23, 1885 |
| 499,159 | Crafts | June 6, 1893 |
| 622,329 | Crafts | Apr. 4, 1899 |
| 881,086 | Stevens | Mar. 3, 1908 |
| 2,100,889 | Wickman | Nov. 30, 1937 |

FOREIGN PATENTS

| | | |
|---|---|---|
| 138,912 | Great Britain | Mar. 10, 1921 |